United States Patent
Miyashita et al.

(10) Patent No.: US 10,827,099 B2
(45) Date of Patent: Nov. 3, 2020

(54) IMAGE PROCESSING APPARATUS FOR DETERMINING A THRESHOLD FOR EXTRACTING AN EDGE PIXEL BASED ON A REGION CORRESPONDING TO A SURFACE FACING AN IMAGING DEVICE

(71) Applicant: PFU LIMITED, Kahoku (JP)

(72) Inventors: Jun Miyashita, Kahoku (JP); Kunihiko Ohmi, Kahoku (JP)

(73) Assignee: PFU LIMITED, Kahoku (JP)

( * ) Notice: Subject to any disclaimer, the term of this patent is extended or adjusted under 35 U.S.C. 154(b) by 0 days.

(21) Appl. No.: 16/378,359

(22) Filed: Apr. 8, 2019

(65) Prior Publication Data

US 2020/0120236 A1 Apr. 16, 2020

(30) Foreign Application Priority Data

Oct. 12, 2018 (JP) .................................. 2018-193866

(51) Int. Cl.
| | |
|---|---|
| *H04N 1/00* | (2006.01) |
| *H04N 1/58* | (2006.01) |
| *G06T 7/136* | (2017.01) |
| *G06T 7/13* | (2017.01) |
| *G06T 7/11* | (2017.01) |
| *H04N 1/60* | (2006.01) |
| *G06T 5/00* | (2006.01) |
| *G06T 7/12* | (2017.01) |

(52) U.S. Cl.
CPC .............. *H04N 1/58* (2013.01); *G06T 5/002* (2013.01); *G06T 7/11* (2017.01); *G06T 7/12* (2017.01); *G06T 7/13* (2017.01); *G06T 7/136* (2017.01); *H04N 1/6027* (2013.01); *G06T 2207/10008* (2013.01)

(58) Field of Classification Search
CPC .................................. H04N 1/58; G06T 7/136
See application file for complete search history.

(56) References Cited

U.S. PATENT DOCUMENTS

| 6,628,833 B1 * | 9/2003 | Horie ................. H04N 1/40062 348/239 |
| 2006/0155458 A1 * | 7/2006 | Kakuda .................... B60T 8/172 701/73 |
| 2009/0009825 A1 * | 1/2009 | Honda ................. H04N 1/3878 358/488 |

(Continued)

FOREIGN PATENT DOCUMENTS

| JP | 2002-135591 A | 5/2002 |
| JP | 2010-250387 A | 11/2010 |
| JP | 2017-163407 A | 9/2017 |

*Primary Examiner* — Ibrahim Siddo
(74) *Attorney, Agent, or Firm* — Lewis Roca Rothgerber Christie LLP

(57) ABSTRACT

An image processing apparatus includes a processor for acquiring an input image, calculating a fluctuation range of a gradation value of a pixel within a region corresponding to a document backing in the input image, determining a threshold, based on the fluctuation range, extracting an edge pixel corresponding to a boundary between a document and the document backing from the input image using the threshold, detecting a document region from the edge pixel, and an output device for outputting an image obtained by cutting a region corresponding to the document region from the input image.

9 Claims, 11 Drawing Sheets

(56) References Cited

U.S. PATENT DOCUMENTS

| | | | |
|---|---|---|---|
| 2013/0063788 A1* | 3/2013 | Iwayama | G06K 9/3233 358/448 |
| 2013/0215480 A1* | 8/2013 | Iwayama | H04N 1/04 358/475 |

\* cited by examiner

IMAGE PROCESSING APPARATUS FOR DETERMINING A THRESHOLD FOR EXTRACTING AN EDGE PIXEL BASED ON A REGION CORRESPONDING TO A SURFACE FACING AN IMAGING DEVICE

CROSS-REFERENCE TO RELATED APPLICATIONS

This application is based upon and claims the benefit of priority of prior Japanese Patent Application No. 2018-193866, filed on Oct. 12, 2018, the entire contents of which are incorporated herein by reference.

TECHNICAL FIELD

Embodiments discussed in the present specification relate to image processing.

BACKGROUND

In recent years, in a task in which an enormous number of documents are handled, a scanner is used to use images obtained by reading the documents. Generally, an image processing apparatus such as a scanner or a personal computer connected to a scanner cuts only a document region from an input image obtained by reading a document, to provide an image accessible to a user. The scanner includes a document backing (color reference board) facing an imaging device, and the image processing apparatus detects a document region by detecting the boundary between the document and the document backing from the input image. However, when the background color of the document is similar to the color of the document backing, it is difficult for the image processing apparatus to accurately detect the document region from the input image.

An image recognition apparatus which recognizes image data including the background and the foreground has been disclosed. The image recognition apparatus calculates a boundary threshold between the background color and the foreground color by image density distribution analysis to calculate an outline of a sheet surface region, extracts an image edge by conducting a binary search in a direction perpendicular to each side near the boundary sides of the sheet surface region, and calculates straight lines constituting four sides (see Japanese Unexamined Patent Publication (Kokai) No. 2010-250387).

An image processing apparatus which determines an edge forming the boundary between a document and a background has also been disclosed. The image processing apparatus calculates the luminance dispersion difference between the luminance dispersion of a first pixel in image data and that of a second pixel around the first pixel. The image processing apparatus determines the first pixel as an edge pixel when the absolute value of the luminance dispersion difference is larger than a luminance dispersion difference threshold or when the absolute value of the luminance difference is larger than a luminance difference threshold (see Japanese Unexamined Patent Publication (Kokai) No. 2017-163407).

SUMMARY

In the image processing apparatus, it is desired to more accurately detect a document region from an input image, regardless of the combination of the background color of a document and the color of a document backing of a scanner.

It is an object of the image processing apparatus, the control method, and the control program to allow more accurate detection of a document region from an input image.

According to an aspect of the apparatus, there is provided an image processing apparatus. The image processing apparatus includes a processor for acquiring an input image, calculating a fluctuation range of a gradation value of a pixel within a region corresponding to a document backing in the input image, determining a threshold, based on the fluctuation range, extracting an edge pixel corresponding to a boundary between a document and the document backing from the input image using the threshold, detecting a document region from the edge pixel, and an output device for outputting an image obtained by cutting a region corresponding to the document region from the input image.

According to an aspect of the method, there is provided a control method for an image processing apparatus including an output device. The method includes acquiring an input image, calculating a fluctuation range of a gradation value of a pixel within a region corresponding to a document backing in the input image, determining a threshold, based on the fluctuation range, extracting an edge pixel corresponding to a boundary between a document and the document backing from the input image using the threshold, detecting a document region from the edge pixel, and outputting to the output device, an image obtained by cutting a region corresponding to the document region from the input image.

According to an aspect of the computer-readable, non-transitory medium storing a computer program, the computer program causes an image processing apparatus including an output device, to execute a process. The process includes acquiring an input image, calculating, a fluctuation range of a gradation value of a pixel within a region corresponding to a document backing in the input image, determining a threshold, based on the fluctuation range, extracting an edge pixel corresponding to a boundary between a document and the document backing from the input image using the threshold, detecting a document region from the edge pixel, and outputting to the output device, an image obtained by cutting a region corresponding to the document region from the input image.

The object and advantages of the invention will be realized and attained by means of the elements and combinations particularly pointed out in the claims. It is to be understood that both the foregoing general description and the following detailed description are exemplary and explanatory, and are not restrictive of the invention, as claimed.

DESCRIPTION OF EMBODIMENTS

Hereinafter, an image processing apparatus, a control method and a computer-readable, non-transitory medium storing a computer program according to an embodiment, will be described with reference to the drawings. However, it should be noted that the technical scope of the invention is not limited to these embodiments, and extends to the inventions described in the claims and their equivalents.

Figure 1:
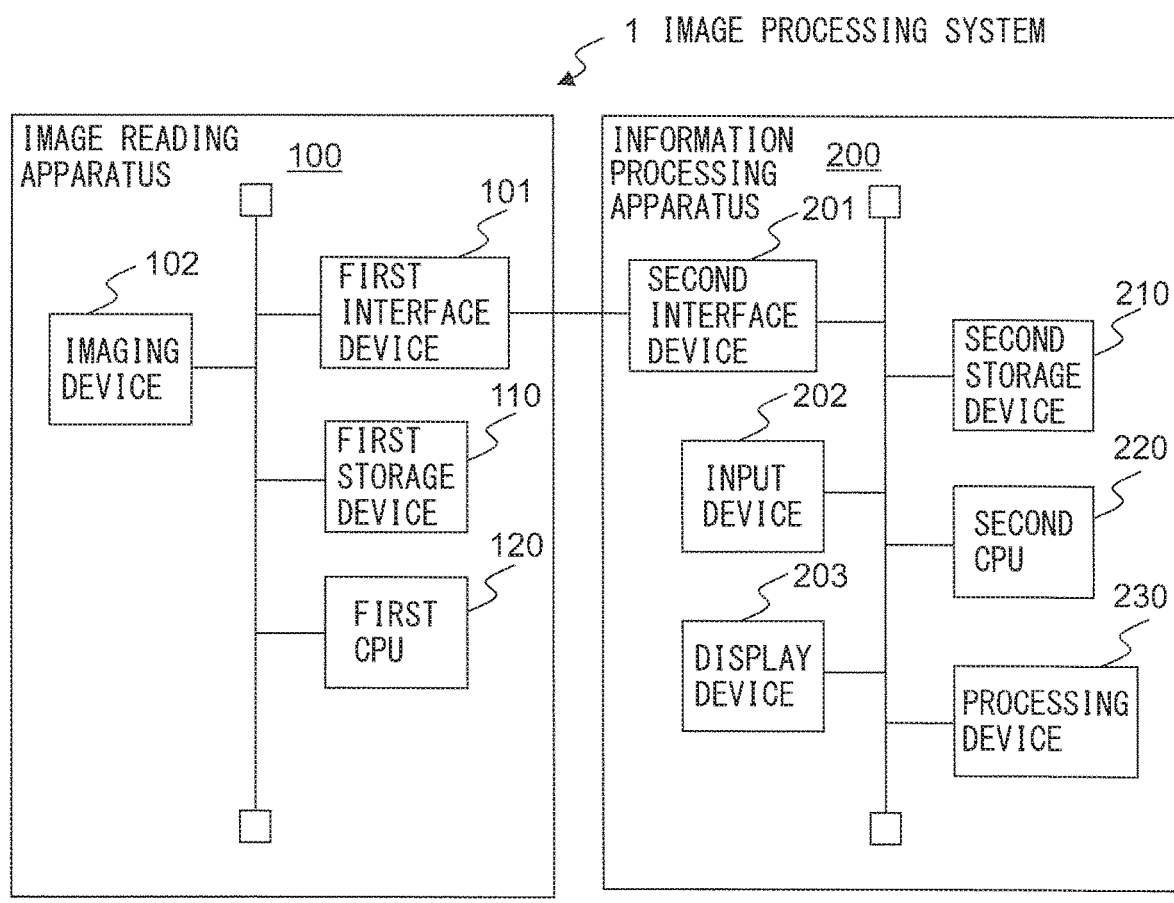
FIG. 1 is a block diagram illustrating the schematic configuration of an image processing system 1 according to an embodiment.

FIG. 1 is a diagram illustrating an image processing system according to an embodiment. An image processing system 1 includes an image reading apparatus 100 and an information processing apparatus 200, as depicted as FIG. 1.

The image reading apparatus 100 is implemented as, e.g., a scanner. The image reading apparatus 100 is more particularly implemented as an ADF (Auto Document Feeder) scanner which transports a document and captures an image of the document. The image reading apparatus 100 is connected to the information processing apparatus 200. The information processing apparatus 200 is an example of an image processing apparatus, such as a personal computer.

The image reading apparatus 100 includes a first interface device 101, an imaging device 102, a first storage device 110, and a first CPU (Control Processing Unit) 120.

The first interface device 101 includes an interface circuit compatible with a serial bus such as USB (Universal Serial Bus) and is electrically connected to the information processing apparatus 20 to transmit and receive image data and various kinds of information. Instead of the first interface device 101, a communication device having an antenna for transmitting and receiving a wireless signal and a wireless communication interface circuit for transmitting and receiving a signal via a wireless communication circuit in accordance with a predetermined communication protocol may be used. The predetermined communication protocol may be, for example, a wireless LAN (Local Area Network).

The imaging device 102 includes a reduction optical system image sensor including image sensing elements implemented as CCDs (Charge Coupled Devices) linearly arrayed in the main scanning direction. The imaging device 102 further includes a light source which emits light, a lens which forms an image on the image sensing elements, and an A/D converter which amplifies and analog/digital (A/D)-converts an electrical signal output from the image sensing elements. In the imaging device 102, the image sensor captures an image of the surface of a transported sheet and generates and outputs an analog image signal, and the A/D converter A/D-converts the analog image signal and generates and outputs a digital input image. The input image is a color multilevel image having each pixel data formed by, e.g., a total of 24 bits of an R (Red) value, a G (Green) value, and a B (Blue) value represented by 8 bits for each of R, G, and B colors. A unit magnification optical system CIS (Contact Image Sensor) including image sensing elements implemented as CMOSs (Complementary Metal Oxide Semiconductors) in place of CCDs may also be used.

The first storage device 110 includes a memory device such as a RAM (Random Access Memory), a ROM (Read Only Memory), a fixed disk device such as a hard disk or a portable storage device such as a flexible disk, an optical disc, or the like. Computer programs, databases, tables etc., which are used for various kinds of processing by the image reading apparatus 10 are stored in the first storage device 110. Further, the first storage device 110 stores a computer program, a database, a table, etc., that are used for various processing of the image reading apparatus 10. The computer program may be installed on the first storage device 110 from a computer-readable, non-transitory medium such as a compact disk read only memory (CD-ROM), a digital versatile disk read only memory (DVD-ROM), or the like by using a well-known setup program or the like. The first storage device 110 further stores, e.g., an input image generated by the imaging device 102.

The first CPU 120 operates based on a program stored in the first storage 110 in advance. Alternatively, a DSP (digital signal processor), an LSI (large scale integration), etc., may be used instead of the first CPU 120. As another alternative, an ASIC (Application Specific Integrated Circuit), an FPGA (Field-Programming Gate Array), etc., may be used instead of the first CPU 120.

The first CPU 120 is connected to, e.g., the first interface device 101, the imaging device 102, and the first storage device 110 and controls each of these units. The first CPU 120 performs, e.g., document reading control of the imaging device 102 and control of data exchange with the information processing apparatus 200 via the first interface device 101.

The information processing apparatus 200 includes a second interface device 201, an input device 202, a display device 203, a second storage device 210, a second CPU 220, and a processing device 230. Each unit constituting the information processing apparatus 200 will be described in detail below.

The second interface device 201 includes an interface circuit similar to that of the first interface device 101 of the image reading apparatus 100 and interconnects the information processing apparatus 200 and the image reading apparatus 100. Instead of the second interface device 201, a communication device having an antenna for transmitting and receiving a wireless signal and a wireless communication interface circuit for transmitting and receiving a signal via a wireless communication circuit in accordance with a predetermined communication protocol such as a wireless LAN or the like may be used.

The input device 202 includes an input device such as a keyboard, a mouse or the like and an interface circuit acquiring signals from the input device and outputs a signal responsive to a user's operation to the second CPU 220.

The second display device 203 is an example of an output device. The second display device 203 includes a display formed by a liquid-crystal display, an organic electroluminescence display or the like and an interface circuit which outputs image data to the display, and is connected to the second storage device 210 to display image data stored in the second storage device 210 on the display.

The second storage device 210 includes a memory device, a fixed disk device, a portable storage device or the like that is similar to that of the first storage device 110 of the image reading apparatus 100. The second storage device 210 stores computer programs, databases, tables etc., used in various kinds of processing by the information processing apparatus 200. Further, the second storage device 210 stores a computer program, a database, a table, etc., that are used for various processing of the information processing apparatus 200. The computer program may be installed on the second storage device 210 from a computer-readable, non-transitory medium such as a CD-ROM, a DVD-ROM, or the like by using a well-known setup program or the like. The second storage device 210 further stores, e.g., the input image received from the image reading apparatus 100, and various processed images obtained by image processing on the input image by the processing device 230.

The second CPU 220 operates based on a program stored in the second storage device 210 in advance. Alternatively, a DSP, an LSI, an ASIC, an FPGA, etc., may be used instead of the second CPU 220.

The second CPU 220 is connected to, e.g., the second interface device 201, the input device 202, the display device 203, the second storage device 210, and the processing device 230 and controls each of these units. The second CPU 220 performs, e.g., control of data exchange with the image reading apparatus 100 via the second interface device 201, input control of the input device 202, display control of the display device 203, and control of image processing by the processing device 230. The second CPU 220 extracts edge pixels corresponding to the boundary between a document and a document backing from the input image using a threshold and detects a document region from the edge pixels.

The processing device 230 performs predetermined image processing on the input image. The processing device 230 is implemented as, e.g., a CPU, a DSP, an LSI, an ASIC, or an FPGA.

Figure 2:
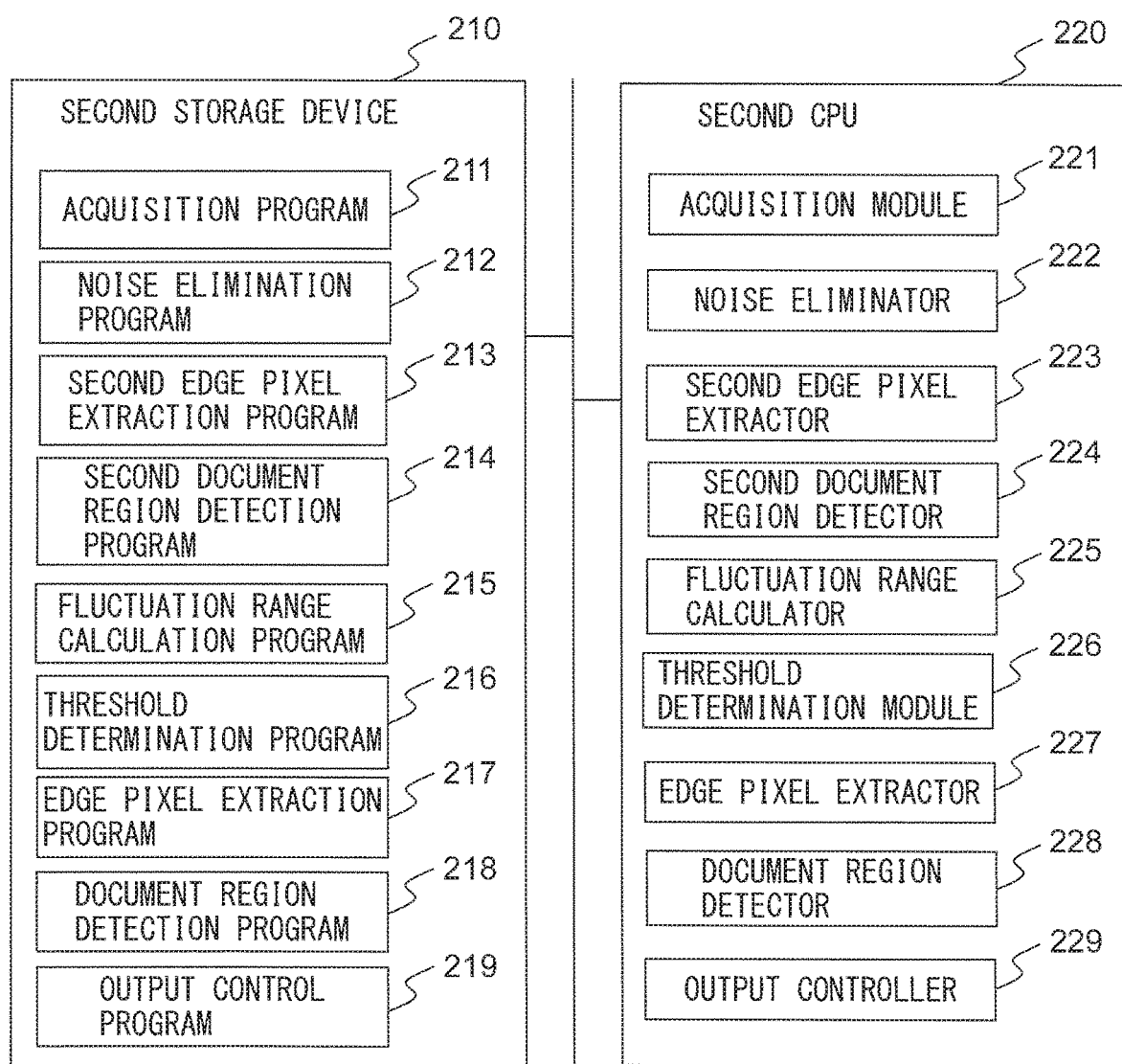
FIG. 2 is a block diagram illustrating the schematic configuration of a second storage device 210 and a second CPU 220.

FIG. 2 is a diagram illustrating the schematic configurations of the second storage device 210 and the processing device 220.

The second storage device 210 stores each program such as an acquisition program 211, a noise elimination program 212, a second edge pixel extraction program 213, a second document region detection program 214, a fluctuation range calculation program 215, a threshold determination program 216, an edge pixel extraction program 217, a document region detection program 218, and an output control program 219, as illustrated in FIG. 2. Each of these programs serves as a functional module implemented as software running on the processor. The second CPU 220 reads each program stored in the second storage device 210 and operates in accordance with each read program. Thus, the second CPU 220 functions as an acquisition module 221, a noise eliminator 222, a second edge pixel extractor 223, a second document region detector 224, a fluctuation range calculator 225, a threshold determination module 226, an edge pixel extractor 227, a document region detector 228, and an output controller 229.

Figure 3:
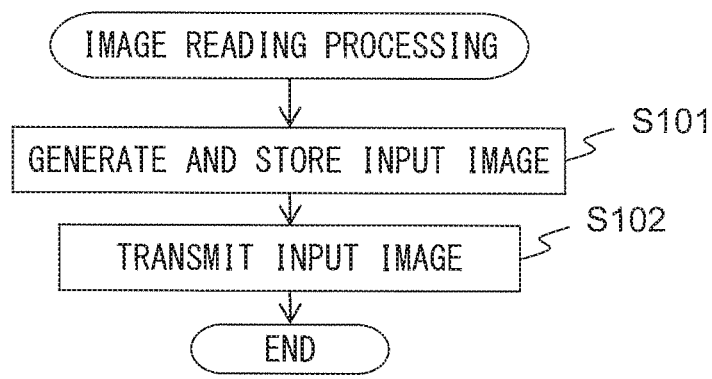
FIG. 3 is a flowchart illustrating the operation of image reading processing.

FIG. 3 is a flowchart illustrating an operation of image reading processing performed by the image reading apparatus 100. The operation of the image reading processing will be described below with reference to the flowchart in FIG. 3. Note that the flow of the operation described below is executed primarily by the first CPU 120 in cooperation with the components of the image reading apparatus 100 in accordance with a program stored in the first storage device 110 beforehand.

First, the imaging device 102 generates an input image by capturing an image of a document and stores it in the first storage device 110 (step S101).

Then the first CPU 120 transmits the input image stored in the first storage device 110 to the information processing apparatus 200 through the first interface device 101 (step S102), then ends the sequence of steps.

FIG. 3 is a flowchart illustrating an operation of rectangle region detection processing performed by the information processing apparatus 200. The operation of the rectangle region detection processing will be described below with reference to the flowchart illustrated in FIG. 3. Note that the flow of the operation described below is executed primarily by the second CPU 220 in cooperation with the components of the information processing apparatus 200 in accordance with a program stored in the second storage device 210 beforehand.

First, the acquisition module 221 acquires an input image from the image reading apparatus 100 through the second interface device 201 and stores the input image in the second storage device 210 (step S201).

Figure 5:
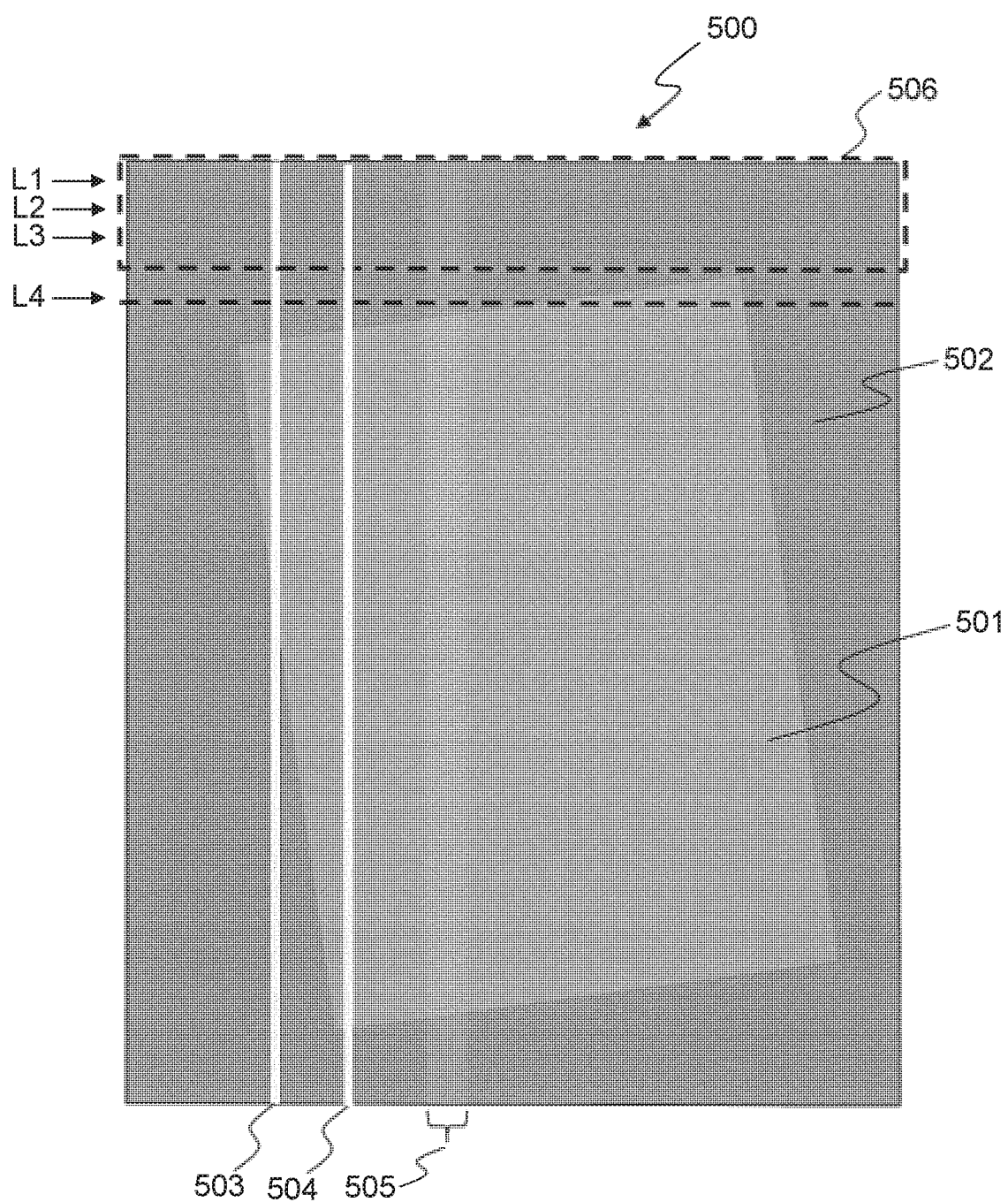
FIG. 5 is a schematic view illustrating an example of an input image 500.

FIG. 5 is a schematic view illustrating an example of an input image 500.

The input image 500 contains a document 501, and a document backing 502 of the image reading apparatus 100, as illustrated in FIG. 5. Both the background of the document 501 and the document backing 502 are black. The input image 500 further contains vertical stripes 503 and 504 and low-frequency noise 505. When a foreign particle such as a powder, dust, or paste adheres onto a light-transmitting member such as glass facing the imaging device 102, vertical stripes occur in an input image captured while moving the document at a position opposite to the imaging device 102. Further, due to individual differences of the image sensing elements linearly arrayed in the main scanning direction in the imaging device 102, low-frequency noise may occur in the input image as a grayscale abnormality unique to the main scanning direction. Low-frequency noise may also occur due to a shift of the imaging axis of the imaging device under the influence of the temperature of the installation environment of the image reading apparatus 100 or upon an impact applied to the image reading apparatus 100.

The acquisition module 221 may convert the input image from a color multilevel image into a monochrome multilevel image. In this case, the acquisition module 221 specifies a maximum value among the R, G, and B values of each pixel, for each pixel in the input image, and generates a multilevel image having the specified maximum value as the gradation value (luminance value) of a pixel corresponding to each pixel.

The noise eliminator 222 specifies a first backing region corresponding to the document backing in the input image (step S202). Generally, since the image reading apparatus 100 starts to capture an image with a margin before the transported document reaches the imaging position of the imaging device 102, an over scanned region which does not include the document is contained in the input image. The document backing appears in an over scanned region 506 located on the side of the vertical upper end (the side on which an image is captured first in the sub-scanning direction) in the input image, as illustrated in FIG. 5. The noise eliminator 222 specifies as a first backing region, an over scanned region within a predetermined range (e.g., within three pixels) from the upper end of the input image, i.e., a line (or lines) in the main scanning direction located within a predetermined range from this upper end. The noise eliminator 222 may specify a region within a predetermined range from the lower end of the input image as a first backing region.

The noise eliminator 222 generates a noise-eliminated image by eliminating noise from the input image, based on the first backing region (step S203). The noise-eliminated image is an example of a second input image obtained by eliminating noise by the noise eliminator 222. The noise eliminator 222 eliminates noise from the input image by subtracting the average of the gradation values of corresponding pixels on a line corresponding to the document backing from the gradation value of each pixel on each line in the main scanning direction of the input image.

Figure 6:
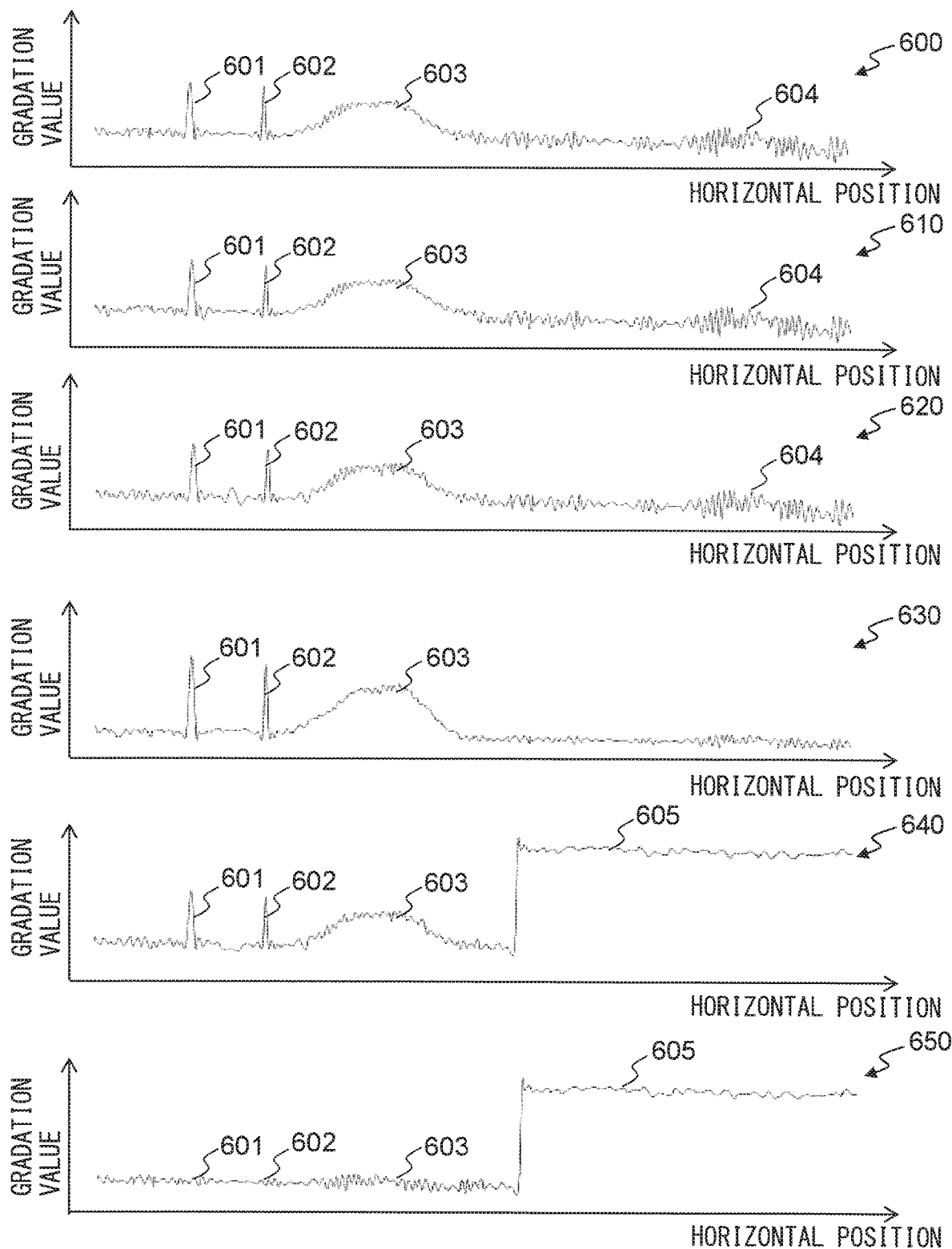
FIG. 6 is a graph for explaining a noise-eliminated image.

FIG. 6 is a graph for explaining a noise-eliminated image.

In graphs 600 to 650 illustrated in FIG. 6, the abscissa represents the horizontal position in the image, and the ordinate represents the gradation value (luminance value) of a pixel at each horizontal position. The graphs 600, 610, and 620 represent the gradation values of lines L1, L2, and L3 in the main scanning direction within the first backing region illustrated in FIG. 5. In the graphs 600, 610, and 620, regions 601, 602, and 603 having a gradation value higher than those of the surrounding regions correspond to the vertical stripes 503 and 504 and the low-frequency noise 505, respectively. In the graphs 600, 610, and 620, a region 604 slightly fluctuating in gradation value corresponds to a high-frequency noise component in each of the lines L1, L2, and L3.

The graph 630 represents the average of the gradation values of mutually corresponding pixels on the respective lines L1, L2, and L3. As represented in the graph 630, a high-frequency noise component as depicted in the region 604, contained in each of the lines L1, L2, and L3, is eliminated by calculating the average of the gradation values of mutually corresponding pixels on the respective lines L1, L2, and L3.

The graph 640 represents the gradation value of a line L4 in the main scanning direction other than the first backing region illustrated in FIG. 5. In the graph 640, a right region 605 having a high gradation value corresponds to the document 501 or a content in the document 501. The graph 650 represents a difference obtained by subtracting the average of the gradation values of mutually corresponding pixels on the respective lines L1, L2, and L3 from the gradation value of each pixel on the line L4. As represented in the graph 650, the components of the vertical stripes 503 and 504 and the low-frequency noise 505 are eliminated, while leaving the components of the document 501, by subtracting the average of the gradation values of mutually corresponding pixels on the respective lines L1, L2, and L3 from the gradation value of each pixel on the line L4.

Figure 7:
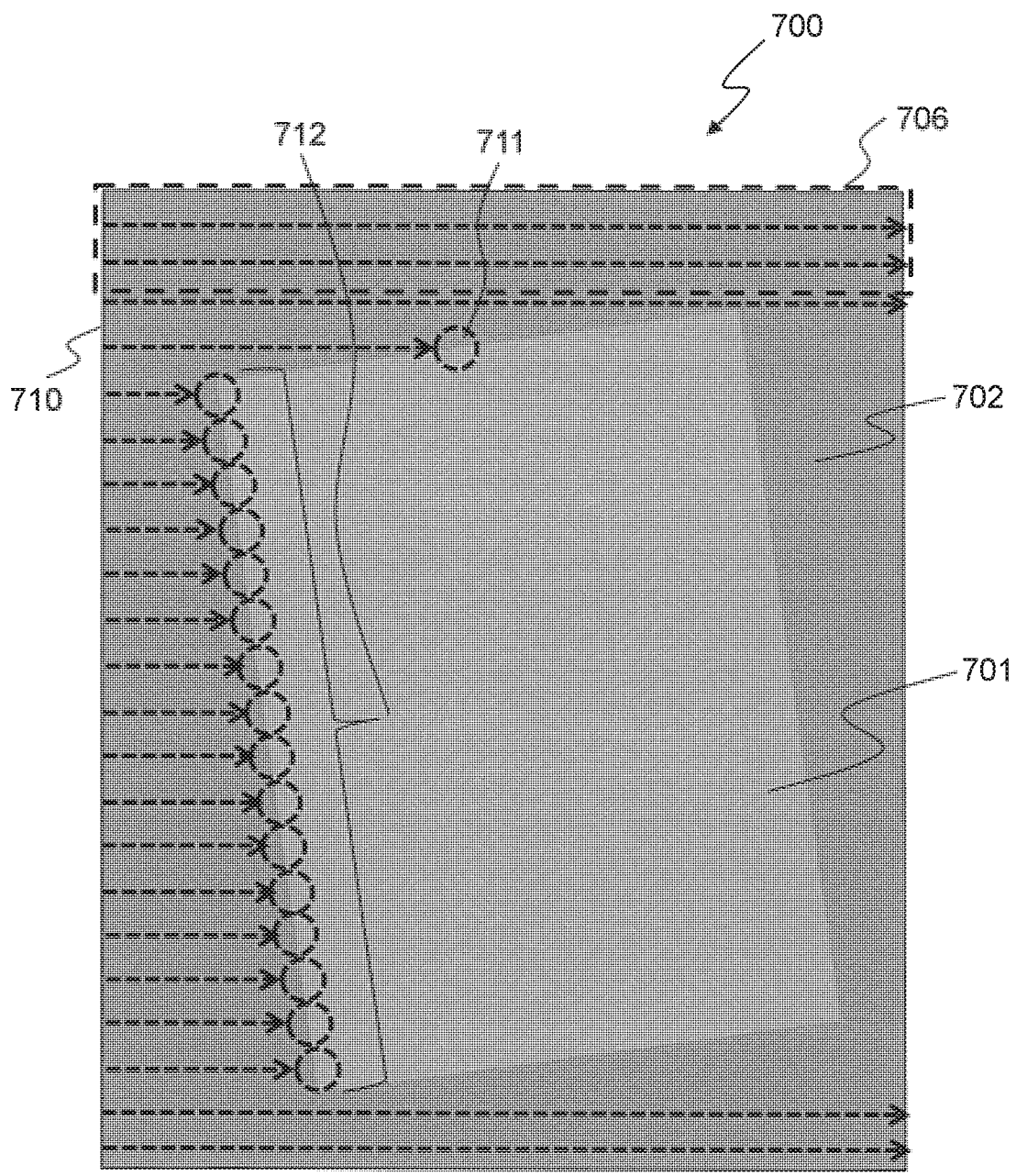
FIG. 7 is a schematic view illustrating an example of a noise-eliminated image 700.

FIG. 7 is a schematic view illustrating an example of a noise-eliminated image 700.

As illustrated in FIG. 7, in the noise-eliminated image 700, the components of the vertical stripes 503 and 504 and the low-frequency noise 505 contained in the input image 500 illustrated in FIG. 5 are eliminated while leaving the components of a document 701.

The noise eliminator 222 may eliminate noise from the input image, using a single line as a line corresponding to the document backing to subtract the gradation value of a corresponding pixel on the single line from the gradation value of each pixel on each line in the main scanning direction of the input image. The noise eliminator 222 may generate a noise-eliminated image by applying a smoothing filter to the input image to eliminate noise from the input image.

The second edge pixel extractor 223 extracts second edge pixels from the noise-eliminated image using a second threshold (step S204). The second threshold corresponds to the difference between a gradation value representing white and that representing black in the image, and is set to a value large enough not to be affected by the noise in the image. In particular, the second threshold is set to a value larger than a threshold (to be described later).

The second edge pixel extractor 223 calculates an absolute value (to be referred to as a neighboring difference value hereinafter) of the difference in gradation value between each pixel and a pixel adjacent to the right of this pixel or a pixel spaced apart from this pixel by a predetermined distance, in turn from the left end of the input image, for each horizontal line (lines in the main scanning direction) in the input image. The gradation value is a luminance value or a color value. The second edge pixel extractor 223 extracts the first (leftmost) pixel having a neighboring difference value equal to or larger than the second threshold as a second edge pixel corresponding to the left side of the document.

As illustrated in FIG. 7, for each horizontal line of the noise-eliminated image 700, a neighboring difference value between each pixel and a pixel on the right side of this pixel is calculated in turn from a left end 710, and leftmost pixels 711 and 712 having a neighboring difference value equal to or larger than the second threshold are extracted as second edge pixels corresponding to the left side of the document. As illustrated in FIG. 7, the pixels 711 and 712 extracted as second edge pixels correspond to the boundary between the document 701 and the document backing 702.

Similarly, the second edge pixel extractor 223 calculates a neighboring difference value between each pixel and a pixel on the left side of this pixel, in turn from the right end of the input image, and extracts the first pixel having a neighboring difference value equal to or larger than the second threshold as a second edge pixel corresponding to the right side of the document, for each horizontal line in the input image. The second edge pixel extractor 223 further calculates a neighboring difference value between each pixel and a pixel on the lower side of this pixel, in turn from the upper end of the input image, and extracts the first pixel having a neighboring difference value equal to or larger than the second threshold as a second edge pixel corresponding to the upper side of the document, for each vertical line in the input image. The second edge pixel extractor 223 further calculates a neighboring difference value between each pixel and a pixel on the upper side of this pixel, in turn from the lower end of the input image, and extracts the first pixel having a neighboring difference value equal to or larger than the second threshold as a second edge pixel corresponding to the lower side of the document, for each vertical line in the input image.

The second edge pixel extractor 223 may calculate as a neighboring difference value, an absolute value of the difference in luminance value between both pixels horizontally or vertically adjacent to each pixel or two pixels spaced apart from each pixel by a predetermined distance. The second edge pixel extractor 223 may even extract a second edge pixel for each predetermined interval, without extracting second edge pixels for all horizontal or vertical lines.

The second edge pixel extractor 223 removes second edge pixels whose horizontal positions are spaced apart from those of vertically adjacent second edge pixels by a predetermined distance or more from the second edge pixels corresponding to each of the left and right sides of the document. Similarly, the second edge pixel extractor 223 removes second edge pixels whose vertical positions are distant from those of horizontally adjacent second edge pixels by a predetermined distance or more from the second edge pixels corresponding to each of the upper and lower sides of the document.

In the example illustrated in FIG. 7, the pixels 712 whose horizontal positions are close to each other are not removed from the second edge pixels, and the pixel 711 whose horizontal position is distant from those of the pixels 712 is removed from the second edge pixels.

The second document region detector 224 detects straight lines from the second edge pixels extracted by the second edge pixel extractor 223 (step S205). The second document region detector 224 detects straight lines respectively corresponding to the left, right, upper, and lower sides of the document from the second edge pixels respectively corresponding to the left, right, upper, and lower sides of the document. The second document region detector 224 detects straight lines using the least squares method. The second document region detector 224 may detect straight lines using Hough transformation.

The second document region detector 224 detects a document region from the detected straight lines (step S206).

The second document region detector 224 extracts rectangle candidates formed by four straight lines respectively corresponding to the left, right, upper, and lower sides of the document. The second document region detector 224 first selects one straight line from straight lines corresponding to the left side of the document and extracts a straight line nearly parallel to (e.g., within ±3°) the selected straight line from straight lines corresponding to the right side of the document. The second document region detector 224 then extracts a straight line nearly perpendicular to (e.g., within ±3° with respect to 90°) a straight line selected from the straight lines corresponding to the left side of the document, from straight lines respectively corresponding to the upper and lower sides of the document.

The second document region detector 224 extracts all combinations of straight lines satisfying the above-mentioned condition and extracts rectangles formed by the respective extracted combinations as rectangle candidates, for all detected straight lines. The second document region detector 224 calculates a degree of distortion for each extracted rectangle candidate. The second document region detector 224 calculates the ratio of the number of second edge pixels within a predetermined distance (e.g., a distance corresponding to 2 mm) from each side of the rectangle candidate to the number of all pixels within the predetermined distance and calculates a difference obtained by subtracting this ratio from 1 as a degree of distortion. Alternatively, the second document region detector 224 calculates a score representing the degree of likeness to a corner for each corner of the rectangle candidate and calculates the reciprocal of the score as a degree of distortion, for each extracted rectangle candidate.

Figure 8:
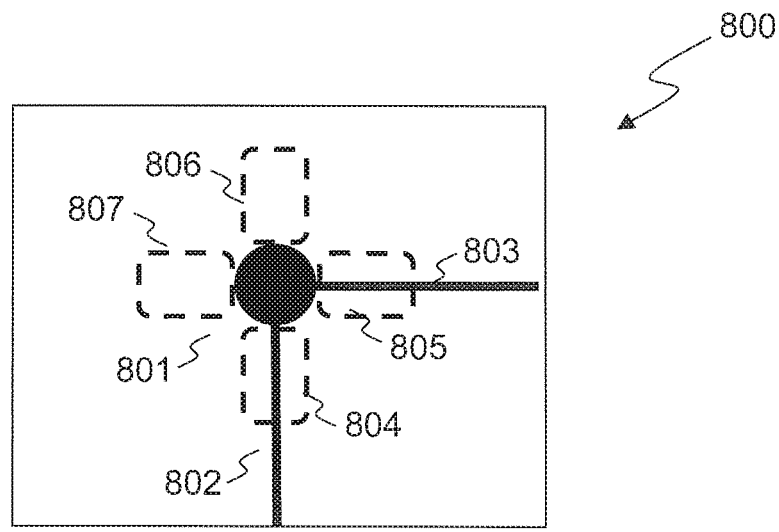
FIG. 8 is a schematic diagram for explaining a score at each corner of a rectangle candidate.

FIG. 8 is a schematic diagram for illustrating the score of each corner of a rectangle candidate.

In the image 800 illustrated in FIG. 8, a point 801 represents a corner of a rectangle candidate and straight lines 802, 803 represent sides of a rectangle candidate. When ends of the straight lines 802, 803 are in contact with each other, the point 801 is likely to be a corner of a rectangle region. When the ends of the straight lines 802, 803 are not in contact with each other or the straight lines 802, 803 cross each other, the point 801 is unlikely to be a corner of a rectangle region.

The base of the scoring is 0. The second document region detector 224 determines whether or not there is an edge pixel in each horizontal line in a region 804 within a predetermined distance from a side 802 near the corner 801. When there is an edge pixel in a horizontal line, 1 is added to the score. The range near each corner and the predetermined distance from each side are chosen as appropriate according to the environment in which the image processing system 1 is used or other factors and may be a range within a distance equivalent to 5 mm from each corner and a distance equivalent to 2 mm from each side, for example. Similarly, the second document region detector 224 determines whether or not there is an edge pixel in each vertical line in a region 805 within the predetermined distance from a side 803 near the corner 801. When there is an edge pixel in a vertical line, 1 is added to the score.

Furthermore, the second document region detector 224 determines whether or not there is an edge pixel in each horizontal line in a region 806 within the predetermined distance from a line extended from the side 802 near the corner 801. When there is an edge pixel in a horizontal line, 1 is subtracted from the score. Similarly, the second document region detector 224 determines whether or not there is an edge pixel in each vertical line in a region 807 within the predetermined distance from a line extended from the side 803 near the corner 801. When there is an edge pixel in a vertical line, 1 is subtracted from the score. The second document region detector 224 normalizes the scores so that the lowest possible score is 0 and the highest possible score is 1 and calculates the reciprocal of the score as a degree of distortion.

The second document region detector 224 removes rectangle candidates having a degree of distortion equal to or greater than a predetermined threshold from the extracted rectangle candidates. Hence, the second document region detector 224 can detect a document region formed by straight lines clearly representing the boundary of the document. The second document region detector 224 further calculates areas for the extracted rectangle candidates and removes rectangle candidates having an area smaller than a predetermined value. The second document region detector 224 detects a rectangle candidate having a largest area among the remaining rectangle candidates as a document region. When none of the rectangle candidate remains, the second document region detector 224 detects no document region. When the second document region detector 224 extracts rectangle candidates which do not overlap each other, it may detect each extracted detected candidate as a document region.

The second document region detector 224 determines whether a document region has been detected (step S207). When a document region has been detected, the second document region detector 224 advances the process to step S215.

When no document region has been detected, the fluctuation range calculator 225 calculates a fluctuation range of the gradation values of pixels within a second backing region corresponding to the document backing in the noise-eliminated image (step S208). As illustrated in FIG. 7, the fluctuation range calculator 225 determines an over scanned region 706 within a predetermined range from the upper end of the input image as a second backing region corresponding to the document backing. The fluctuation range calculator 225 may determine as a second backing region, a region corresponding to the first backing region within the input image in the noise-eliminated image. The fluctuation range calculator 225 may determine as a second backing region, an over scanned region which does not correspond to the first backing region within the input image in the noise-eliminated image.

Figure 9:
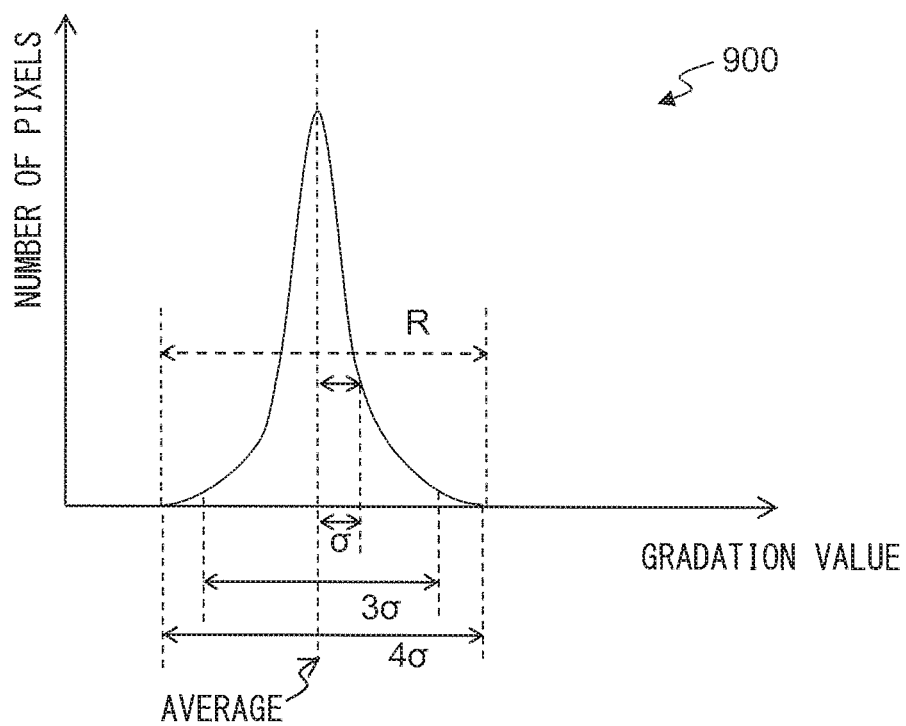
FIG. 9 is a graph for explaining a fluctuation range.

FIG. 9 is a graph for explaining a fluctuation range.

In a graph 900 illustrated in FIG. 9, the abscissa represents the gradation value (luminance value), and the ordinate represents the number of pixels having each gradation value within the second backing region of the noise-eliminated image. As illustrated in FIG. 9, the graph 900 takes the form of a nearly normal distribution having the average of respective gradation values as a center. When a noise-eliminated image is generated by subtracting the gradation value of a corresponding pixel on a line corresponding to the document backing from the gradation value of each pixel on each line in the main scanning direction of the input image, the average of respective gradation values is nearly zero. A fluctuation range R of the gradation values of pixels within the second backing region corresponds to the amount of noise of each pixel within the second backing region.

The fluctuation range calculator 225 calculates a fluctuation range, based on the standard deviation of the gradation values of pixels within the second backing region. The fluctuation range calculator 225 calculates the standard deviation of the gradation values of pixels within the second backing region and, in turn, calculates as a fluctuation range, a value obtained by multiplying the calculated standard deviation by a predetermined coefficient (e.g., 3 or 4). In the normal distribution, the ratios of data which fall within one, two, three, and four times the standard deviation assuming the average as a center are 68.27%, 95.45%, 99.74%, and 99.99%, respectively. Therefore, the fluctuation range calculator 225 can calculate a fluctuation range to include almost all pixels corresponding to the document backing, by setting a predetermined multiple of the standard deviation as the fluctuation range.

The threshold determination module 226 determines a threshold, based on the fluctuation range calculated by the fluctuation range calculator 225 (step S209). The threshold determination module 226 determines the magnitude of the fluctuation range as a threshold. The threshold determination module 226 may determine as a threshold, a value obtained by multiplying the magnitude of the fluctuation range by a predetermined coefficient, or a value obtained by adding a predetermined offset value to the magnitude of the fluctuation range. Hence, the threshold determination module 226 can set as a threshold, the range of values to which the gradation values of almost all pixels corresponding to the document backing belong.

The edge pixel extractor 227 extracts edge pixels corresponding to the boundary between the document and the document backing from the noise-eliminated image using the threshold determined by the threshold determination module 226 (step S210). The edge pixel extractor 227 extracts edge pixels by performing the same processing as that of the second edge pixel extractor 223, using the threshold in place of the second threshold.

In this manner, the edge pixel extractor 227 extracts edge pixels using the threshold only when no document region is detected by the second document region detector 224. Since the threshold is set to the range of values to which the gradation values of almost all pixels corresponding to the document backing belong, the edge pixel extractor 227 can extract pixels slightly fluctuating in gradation value as edge pixels, for the pixels corresponding to the document backing. Therefore, the edge pixel extractor 227 can suitably detect the boundary between the document and the document backing even when the background color of the document is similar to the color of the document backing to the degree that the use of the second threshold is insufficient to distinguish the boundary between the document and the document backing.

The document region detector 228 detects straight lines from the edge pixels extracted by the edge pixel extractor 227 (step S205). The document region detector 228 detects straight lines respectively corresponding to the left, right, upper, and lower sides of the document from edge pixels respectively corresponding to the left, right, upper, and lower sides of the document, like the second document region detector 224.

The document region detector 228 determines whether it has detected four straight lines respectively corresponding to the left, right, upper, and lower sides of the document (step S206). When the document region detector 228 has detected four straight lines respectively corresponding to the left, right, upper, and lower sides of the document, it advances the process to step S214.

When the document region detector 228 has detected not such four straight lines but at least two straight lines extending in a predetermined direction, it generates complementary straight lines, based on these at least two detected straight lines (step S213). When two straight lines extending in a predetermined direction have been detected, and no two straight lines extending in a direction perpendicular to the predetermined direction have been detected, the document region detector 228 generates complementary straight lines to complement the straight lines that have not been detected, based on the two detected straight lines. The document region detector 228 extracts ends closed to the straight lines that have not been detected, in each of the two detected straight lines, and generates as a complementary straight line, a straight line formed by connecting the ends extracted from the respective straight lines to each other. The predetermined direction is the main scanning direction or a direction having an angle smaller than 45° with respect to the main scanning direction. The predetermined direction may be the sub-scanning direction or a direction having an angle smaller than 45° with respect to the sub-scanning direction.

Figure 10:
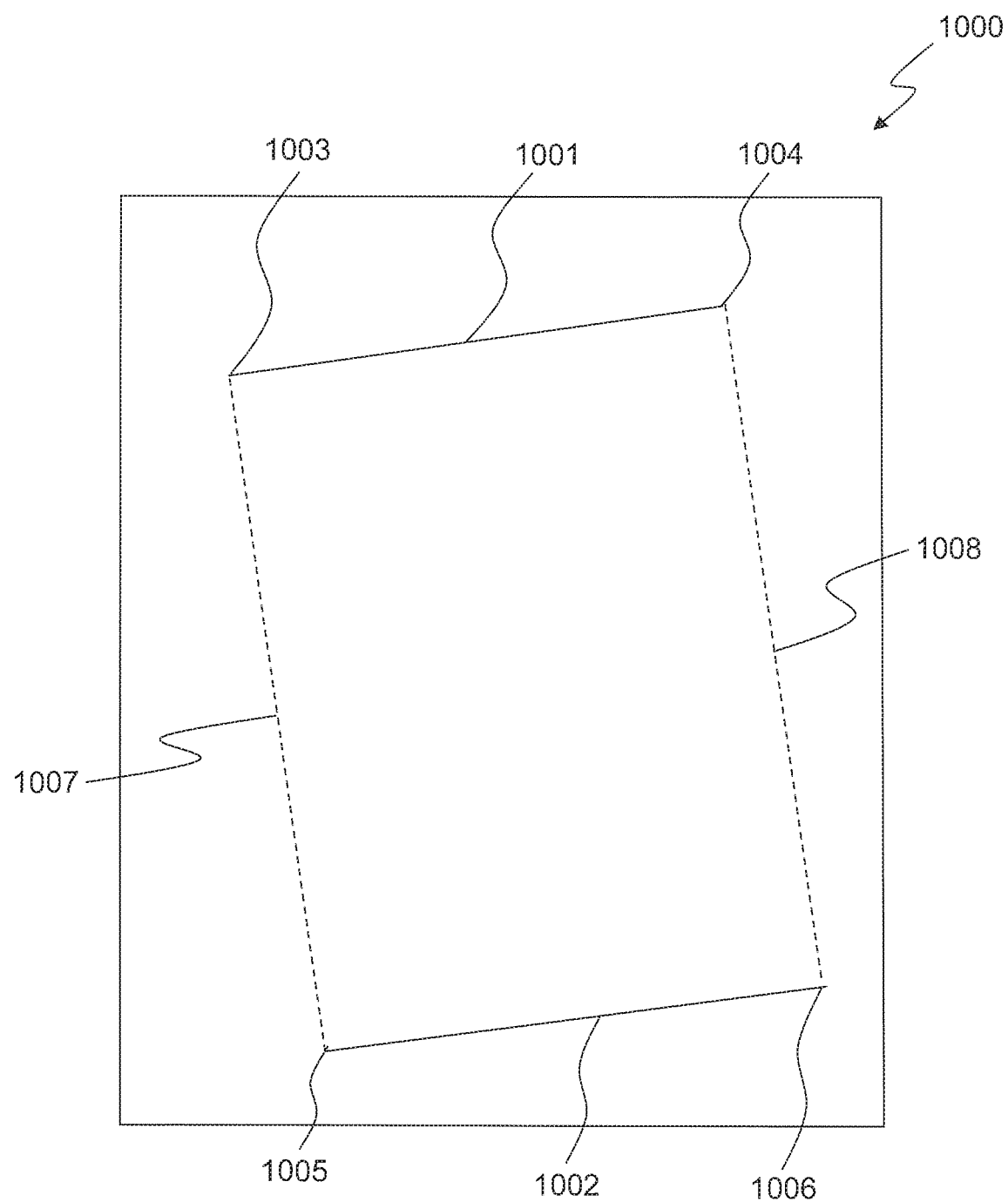
FIG. 10 is a schematic diagram for explaining complementary straight lines.

FIG. 10 is a schematic diagram for explaining complementary straight lines.

An image 1000 illustrated in FIG. 10 is an image having pixels corresponding to edge pixels as effective pixels. From the image 1000, a straight line 1001 corresponding to the upper side of the document is detected from edge pixels corresponding to the upper side of the document, and a straight line 1002 corresponding to the lower side of the document is detected from edge pixels corresponding to the lower side of the document. However, in the image 1000, since no edge pixels corresponding to the left and right sides of the document are extracted, no straight lines corresponding to the left and right sides of the document are detected from the image 1000. In this case, the document region detector 228 extracts a left end 1003 and a right end 1004 from the straight line 1001 corresponding to the upper side of the document and extracts a left end 1005 and a right end 1006 from the straight line 1002 corresponding to the lower side of the document. The document region detector 228 generates as complementary straight lines, a straight line 1007 connecting the left ends 1003 and 1005 to each other and a straight line 1008 connecting the right ends 1004 and 1006 to each other.

Figure 11A:
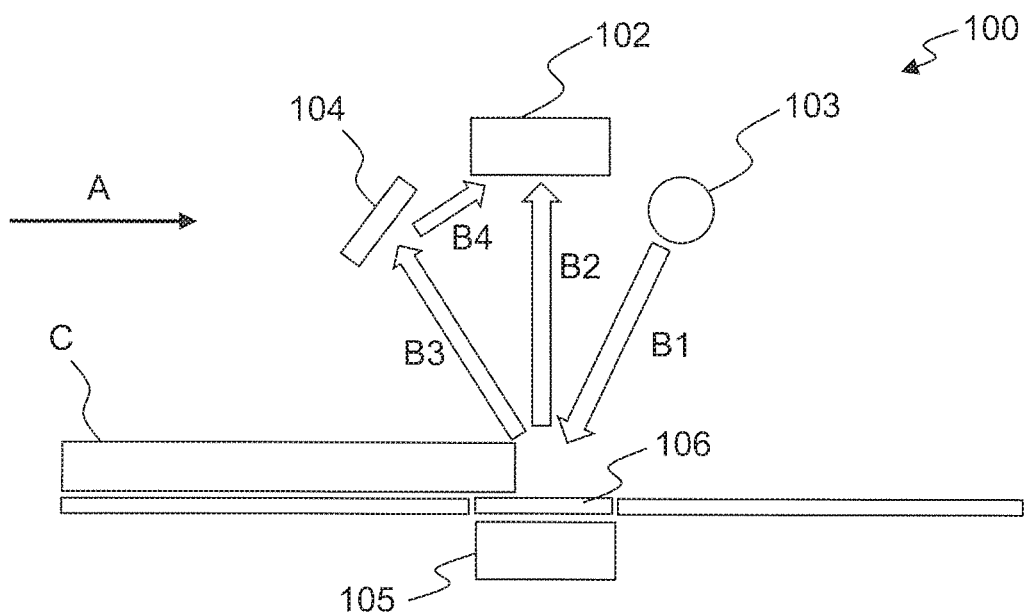
FIG. 11A is another schematic diagram for explaining complementary straight lines.
Figure 11B:
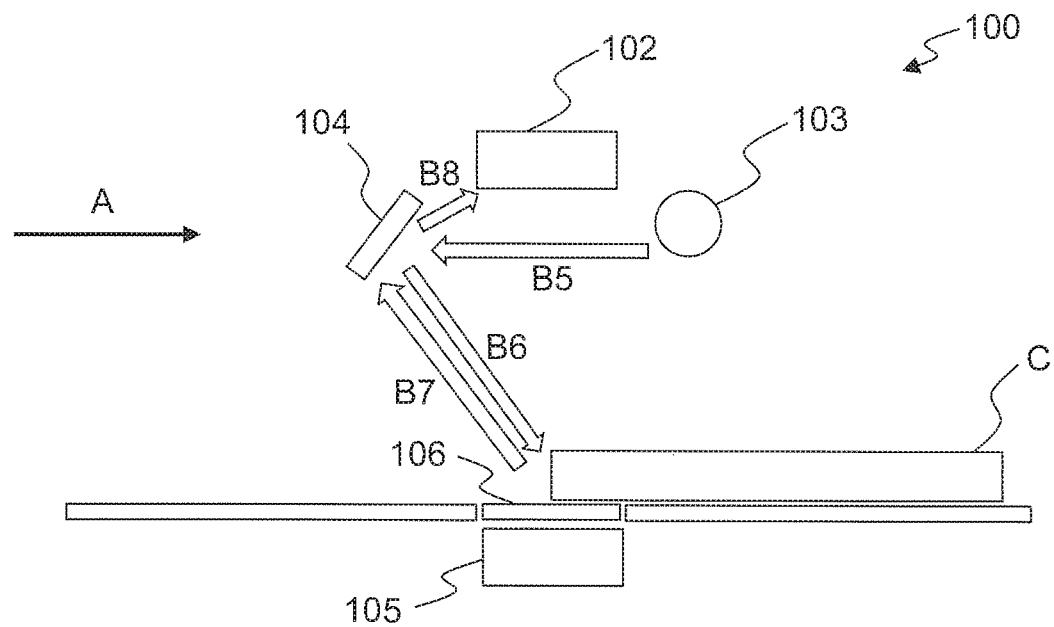
FIG. 11B is still another schematic diagram for explaining complementary straight lines.

FIGS. 11A and 11B are other schematic diagrams for explaining complementary straight lines.

Not only the imaging device 102 but also, e.g., a light source 103, a reflecting plate 104, a document backing 105, and a light-transmitting member 106 are provided in the transport path of the image reading apparatus 100, as illustrated in FIGS. 11A and 11B.

The imaging device 102 is placed opposite to the document backing 105 across the light-transmitting member 106. The light source 103 is placed opposite to the document backing 105 across the light-transmitting member 106 and downstream of the imaging device 102 in a document transport direction A. The light source 103 emits light toward the document transported to the position of the imaging device 102. In particular, the light source 103 emits light as tilted with respect to a direction perpendicular to the transported document. The reflecting plate 104 is placed opposite to the document backing 105 across the light-transmitting member 106 and upstream of the imaging device 102 in the document transport direction A. The reflecting plate 104 reflects toward the imaging device 102, the light emitted by the light source 103 and reflected by the document.

The document backing 105 is a color reference board, and is used as a backing member of the document and a background reflective surface. The document backing 105 is used for correcting the input image. The document backing 105 is placed below the light-transmitting member 106 and faces the imaging device 102, the light source 103, and the reflecting plate 104. The document backing 105 facing the imaging device 102 is black or white. The light-transmitting member 106 is made of transparent glass or plastic and forms a part of the document transport path.

When the document backing 105 facing the imaging device 102 is black, and a card C having a black surface is transported into the transport path of the image reading apparatus 100, images of the surfaces of both the document backing 105 and the card C captured by the imaging device 102 are black. However, even a card having a black surface generally has white side surfaces.

As illustrated in FIG. 11A, when the leading edge of the card C reaches the imaging position of the imaging device 102, light (B1) emitted toward the card C by the light source 103 is reflected by the leading edge side surface of the card C to the imaging device 102 (B2). Further, light (B1) emitted toward the card C by the light source 103 travels toward the reflecting plate 104 (B3) and is reflected by the reflecting plate 104 to the imaging device 102 (B4). Therefore, a white straight line 1001 appears at a position corresponding to the leading edge side surface of the card C, within a captured image of the card C, as illustrated in FIG. 10.

As illustrated in FIG. 11B, when the rear edge of the card C reaches the imaging position of the imaging device 102, light (B5) emitted toward the reflecting plate 104 by the light source 103 is reflected by the reflecting plate 104 to the card C (B6). The light is reflected by the rear edge side surface of the card C back to the reflecting plate 104 (B7) and further reflected by the reflecting plate 104 to the imaging device 102 (B8). Therefore, a white straight line 1002 appears at a position corresponding to the rear edge side surface of the card C, within a captured image of the card C, as illustrated in FIG. 10.

Since the light from the light source 103 is not directly applied to the side surfaces of the card C at the left and right ends along the document transport direction A, no white straight lines appear at positions corresponding to the side surfaces of the card C at the left and right ends, within a captured image of the card C, as illustrated in FIG. 10. In this manner, straight lines extending in the sub-scanning direction within the image can hardly be detected, while straight lines extending in the main scanning direction can easily be detected. When the document region detector 228 has detected straight lines extending in the main scanning direction and has detected no straight lines extending in the sub-scanning direction, it complements the straight lines that have not been detected, using the detected straight lines.

The light source 103 may be placed upstream of the imaging device 102 in the document transport direction A, and the reflecting plate 104 may be placed downstream of the imaging device 102 in the document transport direction A. Even in this case, since a straight line corresponding to the upper side of the card C and a straight line corresponding to the lower side of the card C appear in a captured image of the card C, the document region detector 228 can generate complementary straight lines.

The document region detector 228 detects a document region from the detected straight lines (step S214). When the document region detector 228 has detected four straight lines respectively corresponding to the left, right, upper, and lower sides of the document, it detects a rectangle formed by the four straight lines as a document region. When the document region detector 228 has detected at least two straight lines extending in a predetermined direction, it detects a document region using these at least two detected straight lines. In this case, the document region detector 228 detects as a document region, a rectangle formed by two straight lines extending in a predetermined direction and complementary straight lines generated from the two straight lines.

When sets of straight lines respectively corresponding to the left, right, upper, and lower sides of the document have been detected, the document region detector 228 may extract rectangle candidates and detect a document region from the extracted rectangle candidates, like the second document region detector 224. When the document region detector 228 has extracted rectangle candidates which do not overlap each other, it may detect each extracted detected candidate as a document region, like the second document region detector 224.

The document region detector 228 generates a cut image by cutting a region corresponding to the detected document region from the input image and stores it in the second storage device 210 (step S215). When the input image is converted from a color multilevel image into a monochrome multilevel image, the document region detector 228 generates a cut image from the input image of the color multilevel image. When the document region detector 228 has detected a plurality of document regions, it generates a cut image for each detected document region. When the document region detector 228 has detected no document region, it does not generate a cut image but displays to that effect on the display device 203 to notify the user of this information.

The output controller 229 outputs the cut image by displaying it on the display device 203 (step S213) and ends a series of steps. The output controller 229 may output the cut image by transmitting it to, e.g., a server (not illustrated) via a communication device (not illustrated).

The information processing apparatus 200 may omit the processes in steps S202 and S203 and may extract second edge pixels, calculate a fluctuation range, extract edge pixels, detect straight lines, and detect a document region, from the input image. The information processing apparatus 200 may also omit the processes in steps S204 to S207 and may extract edge pixels always using the threshold. The information processing apparatus 200 may even omit the processes in steps S212 and S213 and may detect no document region when no four straight lines have been detected. With these configurations, the information processing apparatus 200 can detect a document region in a shorter period of time and thus can reduce the load of processing of detecting a document region.

The threshold and the second threshold may be set not as values for a comparison with the neighboring difference value, but as values for a comparison with the gradation value of each pixel. In this case, the second threshold is set to a value between a gradation value representing white and that representing black in the image. The second edge pixel extractor 223 extracts as a second edge pixel, the first pixel wherein the pixel of interest has a gradation value smaller than the second threshold and an adjacent pixel or a pixel spaced apart from the pixel of interest by a predetermined distance has a gradation value equal to or larger than the second threshold, for each horizontal or vertical line. The threshold determination module 226 determines a threshold, based on the gradation values of pixels within the second backing region and the fluctuation range. The threshold determination module 226 determines, e.g., a value obtained by adding the magnitude of the fluctuation range to the average or the median of the gradation values of pixels within the second backing region as a threshold. The edge pixel extractor 227 extracts as an edge pixel, the first pixel wherein the pixel of interest has a gradation value smaller than the threshold and an adjacent pixel or a pixel spaced apart from the pixel of interest by a predetermined distance has a gradation value equal to or larger than the threshold, for each horizontal or vertical line.

Figure 4:
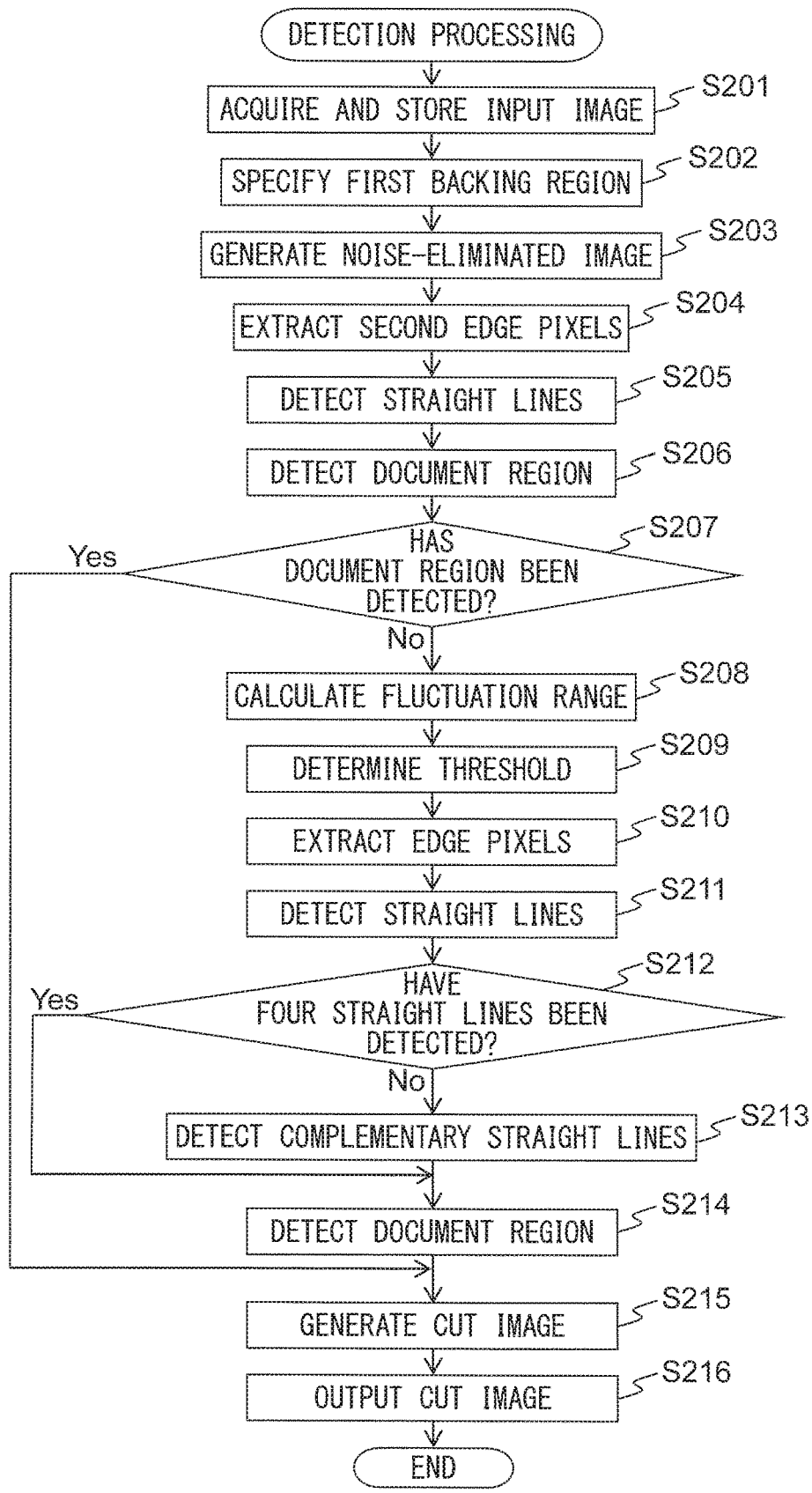
FIG. 4 is a flowchart illustrating the operation of detection processing.

As described in detail above, by operation in accordance with the flowchart illustrated in FIG. 4, the information processing apparatus 200 determines a threshold, based on the fluctuation range of the gradation values of pixels corresponding to the document backing in the input image, and extracts edge pixels using the determined threshold. Hence, the information processing apparatus 200 can suitably detect the boundary between the document and the document backing in the input image even when the background color of the document is close to the color of the document backing and, in turn, can more accurately detect a document region from the input image.

The gradation values of pixels corresponding to the document backing in the input image fluctuate due to, e.g., the influence of the variations of parts such as the imaging device 102 of the image reading apparatus 100 or the temperature of the installation environment of the image reading apparatus 100. The information processing apparatus 200 can absorb (reduce) the influence of the variations of parts of the image reading apparatus 100 or the temperature of the installation environment of the image reading apparatus 100 by determining a threshold, based on the fluctuation range of the gradation values of pixels corresponding to the document backing in the input image.

When a threshold is determined from an input image in which noise such as vertical stripes and low-frequency noise remains uneliminated, the threshold may be set to a large value under the influence of the noise (outlier). In this case, the threshold may be set to a value larger than the difference between the gradation value of the background color of the document and that of the color of the document backing, and the boundary between the document and the document backing may not be detected. The information processing apparatus 200 can set a threshold in the fluctuation range of gradation values which can be taken by pixels corresponding to the document backing, without being influenced by the noise (outlier), by determining a threshold from a noise-eliminated image obtained by eliminating vertical stripes and low-frequency noise. Hence, the information processing apparatus 200 can suitably detect the boundary between the document and the document backing even when the background color of the document is close to the color of the document backing.

The information processing apparatus 200 can suppress erroneous detection of vertical stripes or low-frequency noise as the boundary between the document and the document backing, by determining a second threshold from a noise-eliminated image obtained by eliminating the vertical stripes and the low-frequency noise and extracting second edge pixels.

The information processing apparatus 200 first detects a document region using the second threshold, and detects a document region using a threshold smaller than the second threshold only when no document region is detected. Hence, while the information processing apparatus 200 suppresses erroneous detection of noise close to the color of the document backing as an edge pixel when the background color of the document is different from the color of the document backing, the information processing apparatus 200 can suitably detect the boundary between the document and the document backing even when the background color of the document is close to the color of the document backing.

Figure 12:
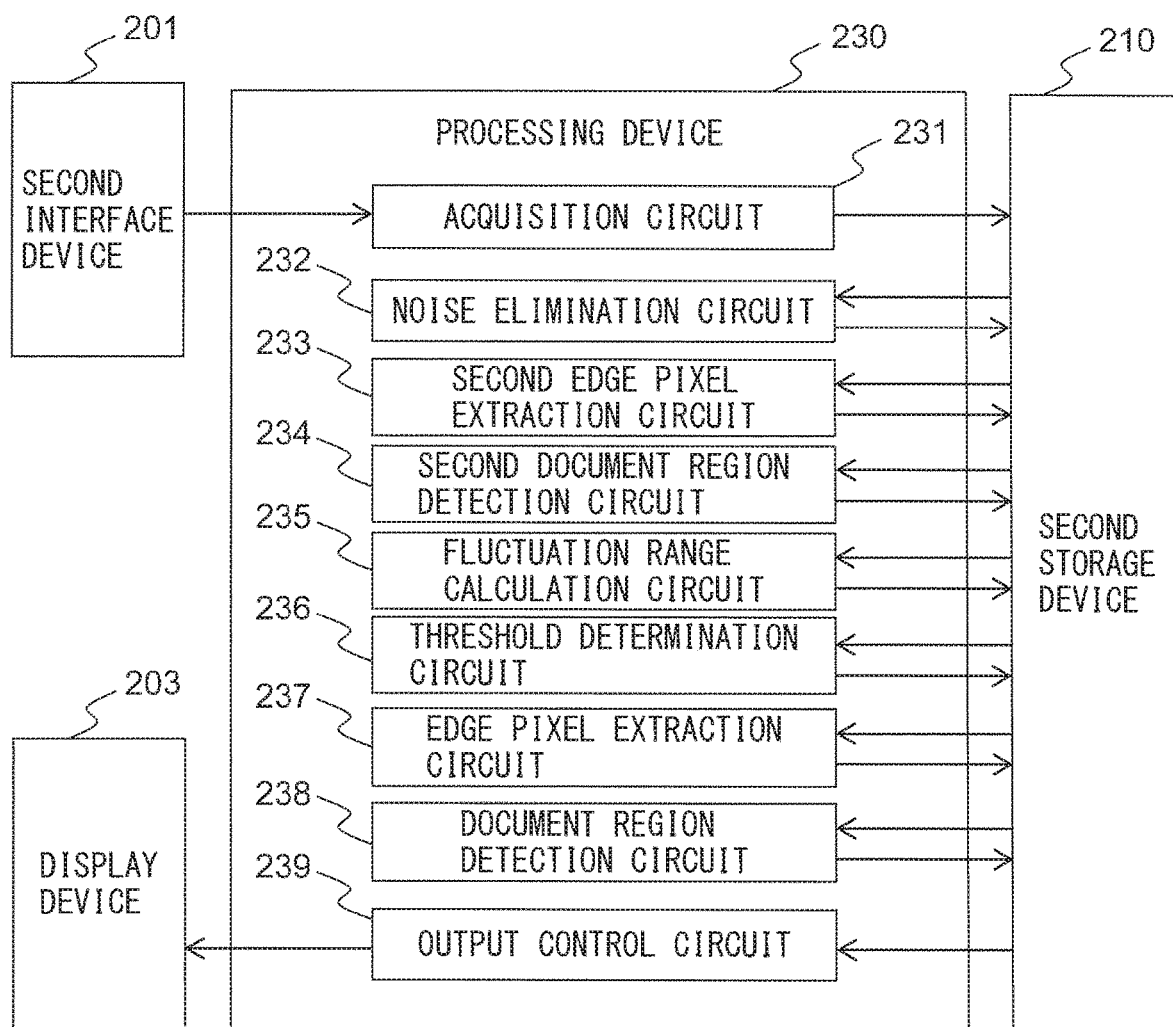
FIG. 12 is a block diagram illustrating the schematic configuration of a processing device 230.

FIG. 12 is a block diagram illustrating the schematic configuration of a processing device 230 in an information processing apparatus according to another embodiment.

The processing device 230 performs detection processing, in place of the second CPU 220. The processing device 230 includes, e.g., an acquisition circuit 231, a noise elimination circuit 232, a second edge pixel extraction circuit 233, a second document region detection circuit 234, a fluctuation range calculation circuit 235, a threshold determination circuit 236, an edge pixel extraction circuit 237, a document region detection circuit 238, and an output control circuit 239.

The acquisition circuit 231 is an example of an acquisition module and has the same function as the acquisition module 221. The acquisition circuit 231 acquires an input image from the image reading apparatus 100 via the second interface device 201 and stores it in the second storage device 210.

The noise elimination circuit 232 is an example of a noise eliminator and has the same function as the noise eliminator 222. The noise elimination circuit 232 reads the input image from the second storage device 210, generates a noise-eliminated image from the input image, and stores it in the second storage device 210.

The second edge pixel extraction circuit 233 is an example of a second edge pixel extractor and has the same function as the second edge pixel extractor 223. The second edge pixel extraction circuit 233 reads the noise-eliminated image from the second storage device 210, extracts second edge pixels from the noise-eliminated image, and stores the extraction result in the second storage device 210.

The second document region detection circuit 234 is an example of a second document region detector and has the same function as the second document region detector 224. The second document region detection circuit 234 reads the noise-eliminated image and the extraction result of second edge pixels from the second storage device 210, detects a document region from the second edge pixels, and stores the detection result in the second storage device 210.

The fluctuation range calculation circuit 235 is an example of a fluctuation range calculator and has the same function as the fluctuation range calculator 225. The fluctuation range calculation circuit 235 reads the noise-eliminated image from the second storage device 210, calculates a fluctuation range of the gradation values of pixels within the second backing region of the noise-eliminated image, and stores it in the second storage device 210.

The threshold determination circuit 236 is an example of a threshold determination module and has the same function as the threshold determination module 226. The threshold determination circuit 236 reads the fluctuation range from the second storage device 210, determines a threshold, based on the fluctuation range, and stores it in the second storage device 210.

The edge pixel extraction circuit 237 is an example of an edge pixel extractor and has the same function as the edge pixel extractor 227. The edge pixel extraction circuit 237 reads the noise-eliminated image and the threshold from the second storage device 210, extracts edge pixels from the noise-eliminated image using the threshold, and stores the extraction result in the second storage device 210.

The document region detection circuit 238 is an example of a document region detector and has the same function as the document region detector 228. The document region detection circuit 238 reads the noise-eliminated image and the extraction result of edge pixels from the second storage device 210, generates a cut image by detecting a document region from the edge pixels, and stores it in the second storage device 210.

The output control circuit 239 is an example of an output controller and has the same function as the output controller 229. The output control circuit 239 reads the cut image from the second storage device 210 and outputs it to the display device 203.

As described in detail above, the information processing apparatus can more accurately detect a document region from an input image even when the processing device 230 is used.

While preferred embodiments have been described above, it is not limited to the embodiments. For example, sharing of functions between an image reading apparatus 100 and an information processing apparatus 200 is not limited to the examples of the image processing system 1 illustrated in FIG. 1; the components of the image reading apparatus 100 and the information processing apparatus 200 can be provided any of the image reading apparatus 100 and the information processing device 200 as appropriate. Alternatively, the image reading apparatus 100 and the information processing apparatus 200 may be configured as a single apparatus.

For example, the first storage device 110 of the image reading apparatus 100 may store each program stored in the second storage device 210 of the information processing apparatus 200, and the first CPU 120 of the image reading apparatus 100 may operate as each module implemented by the second CPU 220 of the information processing apparatus 200. The image reading apparatus 100 may even include a processing device similar to the processing device 230 of the information processing apparatus 200.

In this case, the image reading apparatus 100 includes a display device similar to the display device 203. Since detection processing is performed by the image reading apparatus 100, processing of transmitting and receiving an input image in steps S102 and S201 is omitted. The respective processes in steps S202 to S216 are executed by the first CPU 120 or the processing device of the image reading apparatus 100. These processing operations are similar to those executed by the second CPU 220 or the processing device 230 of the information processing apparatus 200.

Furthermore, the first interface device 101 and the second interface device 201 in the image processing system 1 may be interconnected through a network such as the Internet, a telephone network (including a mobile network and a fixed-telephone network) or an intranet. In that case, each of the first interface device 101 and the second interface device 201 is equipped with an interface circuit for connecting to the network. Additionally, in that case, a plurality of information processing apparatuses may be distributed on the network and the information processing apparatuses may cooperate with one another to perform the rectangle region detection processing and other processing in a distributed manner, so that image processing services can be provided in the form of cloud computing. This enables the document rectangle region detection processing to be efficiently performed by the image processing system 1 for input images read by a plurality of image reading apparatuses.

According to this embodiment, the image processing apparatus, the control method, and the control program can more accurately detect a document region from an input image.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiment(s) of the present inventions have been described in detail, it should be understood that the various changes, substitutions, and alterations could be made hereto without departing from the spirit and scope of the invention.

What is claimed is:

1. An image processing apparatus comprising:
   an imaging device to generate an input image;
   a light source placed at downstream or upstream of the imaging device in a document transport direction, to emit light toward a document transported to a position of the imaging device;
   a reflecting plate placed opposite to the light source across the imaging device in the document transport direction, to reflect the light emitted by the light source and reflected by the document toward the imaging device;
   a processor to
      calculate a fluctuation range of a gradation value of a pixel within a region corresponding to a document backing in the input image;
      determine a threshold, based on the fluctuation range;
      extract an edge pixel corresponding to a boundary between a document and the document backing from the input image using the threshold;
      detect a first line corresponding to an upper side of the document and a second line corresponding to a lower side of the document from the edge pixel;
      detect a first complementary line corresponding to a left side of the document and a second complementary line corresponding to a right side of the document from the first line and the second line;
      detect a rectangle formed by the first line, the second line, the first complementary line and the second complementary line, as a document region; and
   an output device to output an image obtained by cutting a region corresponding to the document region from the input image.

2. The image processing apparatus according to claim 1, wherein the processor
   eliminates noise from the input image, based on the region corresponding to the document backing in the input image, and
   calculates the fluctuation range from a second input image obtained by eliminating the noise.

3. The image processing apparatus according to claim 2, wherein the processor eliminates the noise from the input image by subtracting a gradation value of a corresponding pixel on a line corresponding to the document backing from a gradation value of each pixel on each line in a main scanning direction of the input image.

4. The image processing apparatus according to claim 1, wherein the processor
extracts a second edge pixel from the input image using a second threshold larger than the threshold, and
detects a document region from the second edge pixel, and
wherein the processor extracts the edge pixel using the threshold only when no document region is detected from the second edge pixel.

5. The image processing apparatus according to claim 1, wherein the processor
detects a straight line from the edge pixel,
detects, when four straight lines are detected, a rectangle formed by the four straight lines as the document region, and
detects, when at least two straight lines are detected, the document region using the at least two straight lines.

6. The image processing apparatus according to claim 1, wherein the processor determines a region within a predetermined range from an upper end of the input image as the region corresponding to the document backing.

7. The image processing apparatus according to claim 1, wherein the processor
calculates a standard deviation of the gradation value of the pixel within the region corresponding to the document backing,
calculates as the fluctuation range, a value obtained by multiplying the standard deviation by a predetermined coefficient, and
determines as the threshold, a magnitude of the fluctuation range.

8. A control method, the method comprising:
generating an input image by an imaging device;
emitting light toward a document transported to a position of the imaging device, by a light source placed at downstream or upstream of the imaging device in a document transport direction;
reflecting the light emitted by the light source and reflected by the document toward the imaging device by a reflecting plate placed opposite to the light source across the imaging device in the document transport direction;
calculating a fluctuation range of a gradation value of a pixel within a region corresponding to a document backing in the input image;
determining a threshold, based on the fluctuation range;
extracting an edge pixel corresponding to a boundary between a document and the document backing from the input image using the threshold;
detecting a first line corresponding to an upper side of the document and a second line corresponding to a lower side of the document from the edge pixel;
detecting a first complementary line corresponding to a left side of the document and a second complementary line corresponding to a right side of the document from the first line and the second line;
detecting a rectangle formed by the first line, the second line, the first complementary line and the second complementary line, as a document region; and
outputting an image obtained by cutting a region corresponding to the document region from the input image, by an output device.

9. A computer-readable, non-transitory medium storing a computer program, wherein the computer program causes an image processing apparatus including an imaging device to generate an input image, a light source placed at downstream or upstream of the imaging device in a document transport direction, to emit light toward a document transported to a position of the imaging device, a reflecting plate placed opposite to the light source across the imaging device in the document transport direction, to reflect the light emitted by the light source and reflected by the document toward the imaging device, and an output device, to execute a process, the process comprising:
calculating a fluctuation range of a gradation value of a pixel within a region corresponding to a document backing in the input image;
determining a threshold, based on the fluctuation range;
extracting an edge pixel corresponding to a boundary between a document and the document backing from the input image using the threshold;
detecting a first line corresponding to an upper side of the document and a second line corresponding to a lower side of the document from the edge pixel;
detecting a first complementary line corresponding to a left side of the document and a second complementary line corresponding to a right side of the document from the first line and the second line;
detecting a rectangle formed by the first line, the second line, the first complementary line and the second complementary line, as a document region; and
outputting to the output device, an image obtained by cutting a region corresponding to the document region from the input image.

* * * * *